US007987738B2

(12) United States Patent
Kaps et al.

(10) Patent No.: US 7,987,738 B2
(45) Date of Patent: Aug. 2, 2011

(54) ROTARY SELECTOR

(75) Inventors: Werner Kaps, Weiler-Simmerberg (DE); Harald Rapp, Wangen im Allgäu (DE); Andreas Brauchle, Bad Wurzach (DE)

(73) Assignee: Diehl Ako Stiftung & Co. KG, Wangen (DE)

( * ) Notice: Subject to any disclaimer, the term of this patent is extended or adjusted under 35 U.S.C. 154(b) by 367 days.

(21) Appl. No.: 12/181,763

(22) Filed: Jul. 29, 2008

(65) Prior Publication Data

US 2009/0038921 A1 Feb. 12, 2009

(30) Foreign Application Priority Data

Aug. 11, 2007 (DE) ........................ 10 2007 037 965

(51) Int. Cl.
*F16H 35/18* (2006.01)

(52) U.S. Cl. ..................................................... 74/10.41

(58) Field of Classification Search .................. 74/10 R, 74/10.1, 10.41

See application file for complete search history.

(56) References Cited

U.S. PATENT DOCUMENTS 2,854,855 A * 10/1958 Dudley ........................... 74/405
3,196,237 A * 7/1965 Westgate, Jr. ................. 200/565
3,843,186 A 10/1974 Van de Wetering
5,589,671 A * 12/1996 Hackbarth et al. ............ 200/6 R
6,374,696 B1 4/2002 Blake et al.
2005/0145466 A1 7/2005 Wang

FOREIGN PATENT DOCUMENTS

DE 1219560 A 6/1966
DE 2054508 5/1972
DE 4430018 A1 2/1996
DE 10062533 A1 9/2001
EP 0359070 A2 3/1990
EP 0974843 A1 1/2000
GB 1000853 8/1965
GB 2372151 A 8/2002

* cited by examiner

*Primary Examiner* — Vicky A Johnson
(74) *Attorney, Agent, or Firm* — Laurence A. Greenberg; Werner H. Stemer; Ralph E. Locher

(57) ABSTRACT

A rotary selector forms a control element for inputting a setting value to an electronic control system, in particular for a control device of an electronic domestic appliance, such as a washing machine, a dishwasher, or the like. The rotary selector has a rotatably mounted control portion and an adapter non-rotatably connected to the control portion. The adapter has a latching section with side faces arranged uniformly about its periphery. Coaxially with the latching section of the adapter is a stationary spring element formed with elastic legs arranged uniformly about a periphery of the latching section and which extend tangentially relative to the side faces of the latching section. The number of the side faces of the latching section is an integral multiple of the number of the elastic legs of the spring element.

15 Claims, 4 Drawing Sheets

ROTARY SELECTOR

CROSS-REFERENCE TO RELATED APPLICATION

This application claims the priority, under 35 U.S.C. §119, of German application DE 10 2007 037 965.1, filed Aug. 11, 2007; the prior application is herewith incorporated by reference in its entirety.

BACKGROUND OF THE INVENTION

Field of the Invention

The present invention concerns a rotary selector as a control element which can be used in particular for a control device of an electronic domestic appliance such as for example a washing machine, a dishwasher, or the like.

Rotary selectors of that kind serve as a control element for the input of a setting value to an electronic control system of a domestic appliance and have a rotatably mounted control portion and an adapter which is non-rotatably connected to the control portion and the rotary position of which can be detected or transmitted. To permit a defined input of the setting value by the user, the rotary selector is usually latched in a plurality of rotary positions distributed uniformly in the peripheral direction.

Various constructions are known from the prior art for achieving the latching action for the rotary selector. As shown in FIGS. 5 and 6 the adapter of the rotary selector is provided with a latching section 40, the outer periphery of which is shaped in a wave form with raised portions 41*a* and recesses 41*b* which are formed and arranged regularly in the circumferential direction. In the case shown in FIG. 5, arranged at a position on the periphery of the latching section 40 is a push rod 42 which is biased by a spring 43 in the direction towards the latching section 40 of the adapter so that, upon the rotation of the rotary selector by a user, the push rod 42 successively engages into the recesses 41*b* of the latching section 40. The use of a spring-loaded ball is also known, instead of the push rod 42.

The conventional structure shown in FIG. 6 uses an omega spring 44, that is to say an elastic element which is bent in the shape of an omega (Ω) and the curved part of which engages into the recesses 41*b* of the latching section 40. As a further alternative, latching of the adapter of the rotary selector is also implemented with a leaf spring.

SUMMARY OF THE INVENTION

It is accordingly an object of the invention to provide a rotary selector, which overcomes the above-mentioned disadvantages of the heretofore-known devices and methods of this general type and which provides for an improved latching characteristic.

With the foregoing and other objects in view there is provided, in accordance with the invention, a rotary selector forming a control element for inputting a setting value to an electronic control system, comprising:

a rotatably mounted control portion and an adapter rotationally fixed to said control portion and disposed to assume rotary positions to be detected and transmitted to the electronic control system;

said adapter having a latching section with a given number of side faces formed and arranged uniformly in a circumferential direction;

a stationary spring element coaxially disposed with said latching section of said adapter, said spring element having a given number of elastic legs formed and arranged uniformly in the circumferential direction of said latching section and extending tangentially relative to said side faces of said latching section; and the given number of said side faces of said latching section being an integral multiple of the given number of said elastic legs of said spring element.

In other words, the rotary selector as a control element for the input of a setting value to an electronic control system comprises a rotatably mounted control portion and an adapter which is non-rotatably connected to the control portion and the rotary position of which can be detected or transmitted and according to the invention is, wherein the adapter has a latching section with a predetermined number of side faces which are formed and arranged uniformly in the peripheral direction; provided in coaxial relationship with the latching section of the adapter is a stationary spring element having a predetermined number of elastic legs which are formed and arranged uniformly in the peripheral direction of the latching section and which extend tangentially relative to the side faces of the latching section; and the number of the side faces of the latching section is an integral multiple of the number of the elastic legs of the spring element.

In the rotary selector of the present invention latching is implemented by means of a latching section having a plurality of side faces on the adapter and a spring element having a plurality of elastic legs, in that, when the operating element is rotated by a user, a part of the side faces of the latching section successively comes into surface contact with the elastic legs of the spring element in the initial position thereof. With that structure, in contrast to the constructions described in the opening part of this specification for a conventional rotary selector, the spring forces of the elastic legs act on the shaft of the rotary selector from a plurality of sides, thus achieving a more pleasant and agreeable latching characteristic of the rotary selector for the user. In addition the positional accuracy of the rotary selector is maintained over its entire period of use and wear is reduced by virtue of the uniform action of forces over the periphery of the latching section of the adapter of the rotary selector.

In a preferred configuration of the invention the spring element is made from a plastic material. As the spring element is made from a plastic material the latching noises can be reduced.

In a further preferred configuration of the invention the spring element can be provided integrally with a housing of the electronic control system, for example injection molded thereon. With that construction the number of individual components and thus the assembly complication and expenditure can be reduced.

Preferably the predetermined number of the elastic legs of the spring element is three (delta spring), four (rhombus spring) or five (pentagon spring).

Furthermore the elastic legs of the spring element can preferably be connected together by way of a connecting ring which is provided integrally with the elastic legs and/or are respectively supported at both sides at their two ends.

In a configuration of the invention the rotary position of the adapter can be detected in contacting relationship or contactlessly by a sensor of the electronic control system (for example a magnetic sensor). Alternatively the rotation of the adapter can be transmitted to a setting drive (for example a potentiometer) of the electronic control system. In the latter case the adapter can be formed with a gear and the spring element can be provided with a mounting location for a transmission of the setting drive of the electronic control system, which transmission is in engagement with the gear of the adapter.

In a further configuration of the invention there is associated with the control portion of the rotary selector a plate insert arranged coaxially with respect to the control portion as an information carrier, on which for example there are items of information about the function of the rotary selector and/or about the setting values attributed to the rotary positions of the rotary selector, for the user.

In still a further configuration of the invention the control portion and the adapter of the rotary selector are in the shape of a hollow cylinder so that a push button can be arranged in the hollow cylinder of the rotary selector as a control element for the input of a further setting value to the electronic control system.

Advantageously the rotary selector can be used in a control device of an electronic domestic appliance such as for example a washing machine, a laundry drier, a dishwashing machine, a microwave oven, a cooker and the like.

Other features which are considered as characteristic for the invention are set forth in the appended claims.

Although the invention is illustrated and described herein as embodied in rotary selector, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1A:
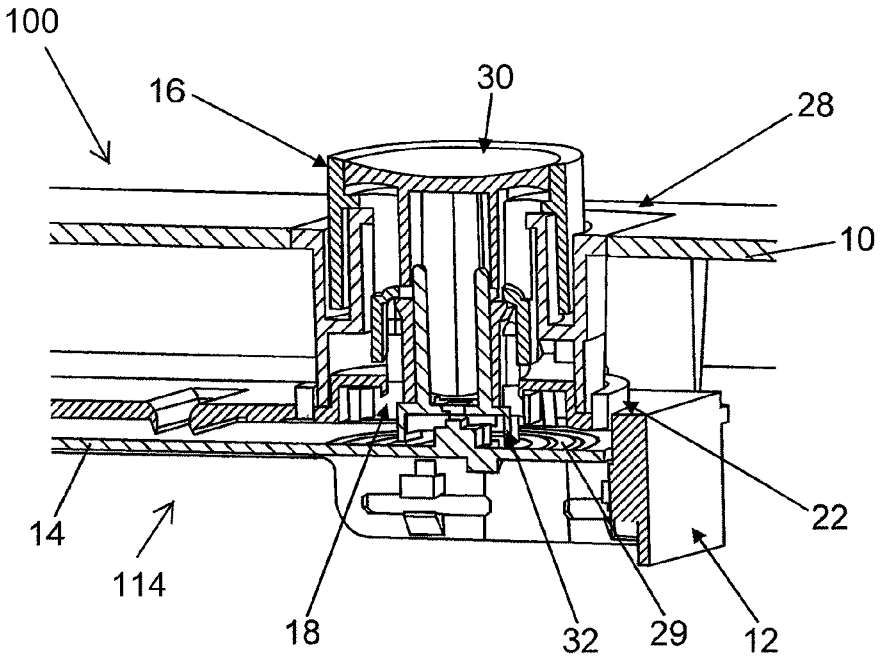
FIG. 1A is a perspective view in section through a rotary selector in accordance with a first embodiment of the present invention.

Referring now to the figures of the drawing in detail and first, particularly, to FIGS. 1A and 1B thereof, the apparatus according to the invention will now be described in greater detail a first embodiment of a rotary selector.

The rotary selector of this specific embodiment is used for example as a control element within a control panel 10 of an electronic domestic appliance such as a washing machine, a laundry drier, a dishwashing machine, a microwave oven, a cooker and the like, without being limited to those uses. Disposed behind the control panel 10 is a housing 12 for accommodating an electronic control system 114 of the electronic domestic appliance 100 including a circuit board 14 with corresponding components.

The main constituent parts of the rotary selector are a control portion 16 which projects out of the control panel 10 through an opening therein and which is rotatably mounted, an adapter 18 which is non-rotatably connected to the control panel portion 16, and a spring element 22. The rotary position of the control portion 16 or the adapter 18 can be detected for example by way of a rotary position sensor 29 (for example a magnetic sensor with Hall elements) and can be evaluated by the electronic control system in order to implement the setting value desired by the user. It will be noted however that the present invention is not limited to that manner of detecting the rotary position of the rotary selector and alternatively can also be so designed that the rotation of the adapter 18 can be transmitted to a setting drive of the electronic control system (see the second embodiment described hereinafter).

Figure 1B:
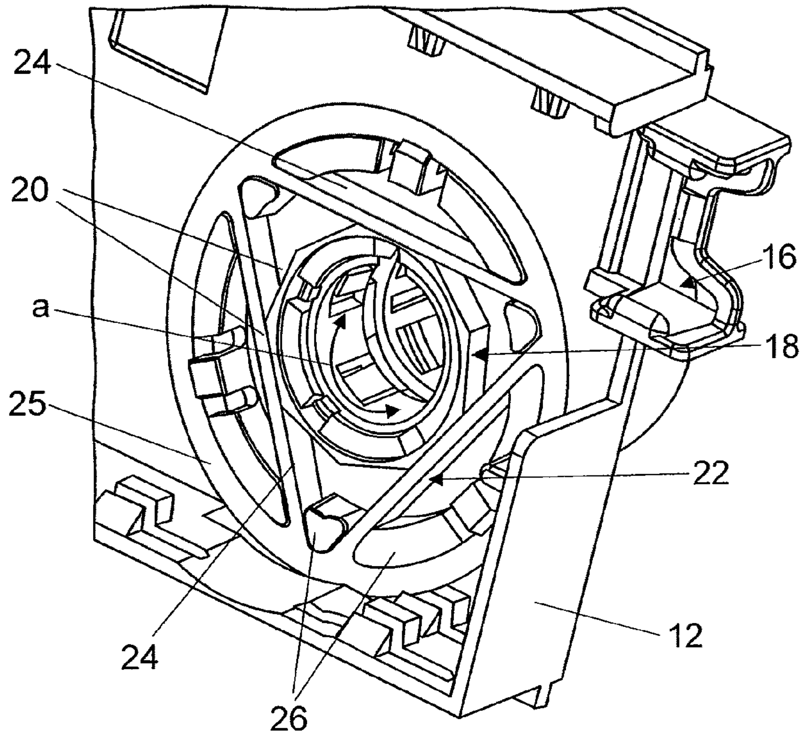
FIG. 1B is a perspective view from below of the rotary selector in accordance with the first embodiment of the present invention.

The adapter 18 of the rotary selector is provided in its lower end region with a latching section 19 provided with a predetermined number (six in this embodiment) of side faces 20 which are provided and arranged uniformly in the peripheral direction (see FIG. 1B). In that case the side faces 20 are of a substantially flat and straight configuration. The adapter 18 with its latching section 19 is rotated jointly with the control portion 16 (arrow a) as the two elements are non-rotatably connected together (for example a plug-in connection).

The spring element 22 which is arranged stationarily and which, with a suitable choice of material, can advantageously be injection molded to the housing 12 so that the number of components and thus also the assembly complication and expenditure are reduced is arranged in coaxial relationship with the adapter 18 of the rotary selector. The spring element 22 has a predetermined number (three in this embodiment) of elastic legs 24 which are provided and arranged uniformly in the peripheral direction of the latching section 19. The elastic legs 24 are of a substantially straight configuration and extend tangentially relative to the side faces 20 of the latching section 19 so that the elastic legs 24 of the spring element 22 can come into surface contact with the side faces 20 of the latching section 19 of the adapter 18, as shown in the rotary position of FIG. 1B.

In that respect the number of the side faces 20 of the latching section 19 is an integral multiple of the number of elastic legs 24 of the spring element 2. In that way, when the control element 16 is rotated by a user, some (in each case three in this embodiment) of the side faces 20 of the latching section 19 always come successively into surface contact with the elastic legs 24 of the spring element 22 in the initial position thereof so that the rotary selector latches in that rotary position.

In contrast to the conventional rotary selectors described in the opening part of this specification, with this structure of the rotary selector the spring forces exerted by the elastic legs 24 of the spring element 22 act from a plurality of sides (three in this embodiment) on the shaft of the rotary selector. That provides a more pleasant and more agreeable latching characteristic on the part of the rotary selector for the user and in addition the positioning accuracy of the rotary selector is maintained over its entire period of use by virtue of the more uniform action of forces over the periphery of the latching section 19 of the adapter 18, and also the amount of wear is reduced.

Figure 2:
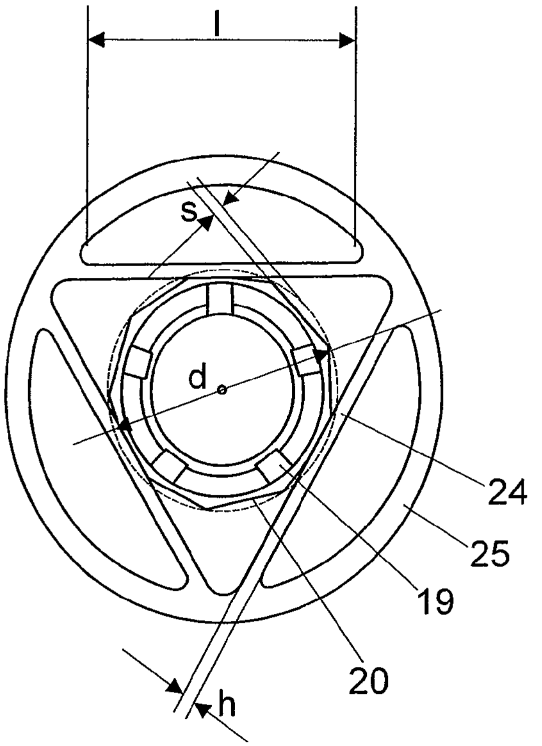
FIG. 2 is a diagrammatic view of the functionally primary elements of the rotary selector to explain structural parameters.

As shown in FIGS. 1B and 2 the elastic limbs 24 of the spring element 22 are preferably connected together by way of a connecting ring 25 which is formed integrally with the elastic legs and formed from the same material as same. Preferably the spring element 24 is a one-piece component.

In addition, as shown in FIG. 1B, provided on the housing 12 are supports 26 which support the elastic legs 24 of the spring element 22 respectively at both sides at the two ends thereof. That increases the stability of the spring element 22 and promotes the return of the elastic legs 24 into their initial position.

The spring element 22 is preferably formed from a plastic material (for example POM) so that the latching noises of the rotary selector are damped. In addition it is possible to use the following materials: for the control portion 16 and the plate insert 28 for example ABS plastic material, for the adapter 18 for example PET or PA, and for the housing 12 for example PC+ABS-FR. It will be appreciated however that the present invention is not restricted to the materials specified here.

The rotary selector designed in that fashion offers the user a more pleasant and agreeable latching behavior than the previous solutions in the state of the art. In addition the latching noises can be damped if the spring element 22 is formed from a suitable plastic material. Furthermore, as described, the reliability and durability of the rotary selector are improved.

Various structural parameters of the rotary selector shown in FIGS. 1A and 1B are described in greater detail with reference to FIG. 2.

The diameter d of the latching section 19 of the adapter 18 is for example 25.80 mm. In that respect the diameter d is measured with respect to the envelope curve at the outside edges of the adapter 18 between the individual side faces 20. The free length l of the three elastic leg elements 24 is for example 30.0 mm and the thickness h of the elastic legs 24 is for example 1.6 mm. The maximum spacing between the side faces 20 of the latching section 19 and the above-mentioned envelope curve is 0.80 mm, wherein that spacing at the same time signifies the deflection s of the elastic legs 24 upon a rotary movement of the control element 16 and the adapter 18.

For the flexural spring which is gripped at both ends and which is formed by the elastic legs 24, with a simple loading at the centre, the following applies for the maximum elongation $\epsilon$:

$$\epsilon=\sigma_{max}/E_0=69\ \text{N/mm}^2/2800\ \text{N/mm}^2=0.02464 \quad (1)$$

where: $\sigma_{max}$=maximum bending stress (for example 69 N/mm$^2$ for POM)

$E_0$=bending modulus of elasticity (for example 2800 N/mm$^2$ for POM).

On the assumption of a rectangular cross-section in respect of the elastic legs 24, that gives, for the permissible deflection sperm, that is to say the spring travel of the elastic legs 24:

$$S_{perm}=(l^2/12h)\times\epsilon=[(30\ \text{mm})^2/12\times1.6\ \text{mm}]\times0.02464=1.2\ \text{mm} \quad (2)$$

As described hereinbefore the elastic legs 24 are bent outwardly by 0.8 mm upon a rotary movement of the adapter so that, with an assumed bias of 0.1 mm for the elastic legs 24, there is an actually maximum deflection of 0.9 mm. As that value is less than the above-calculated value of sperm=1.2 mm, no material damage is to be expected and the elastic legs 24 of the spring element 22 resume their undeformed position again sometime after relief of load.

Figure 3:
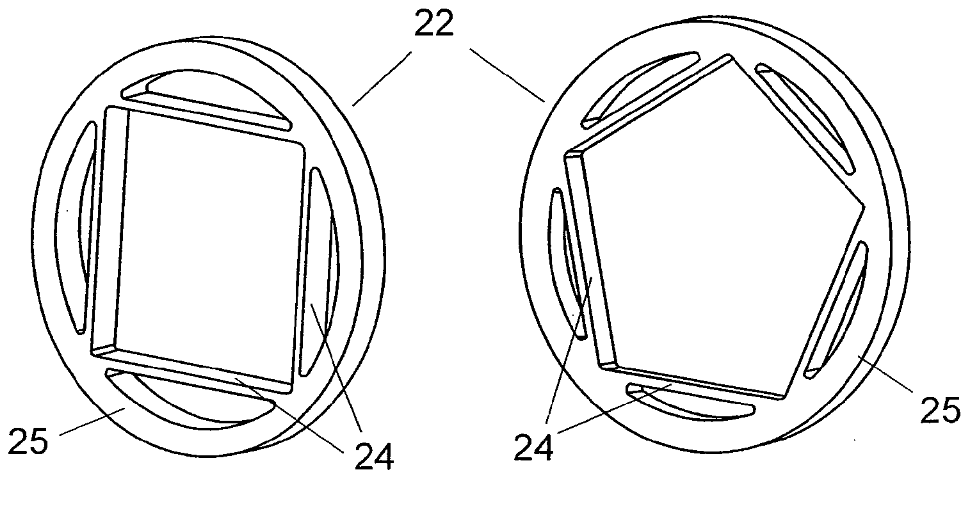
FIG. 3 shows views of alternatives for the spring element of the rotary selectors of FIG. 1.

In the above-described first embodiment the rotary selector with the spring element 22 with three elastic legs 24 (delta spring) affords a total of six latched rotary positions corresponding to the number of side faces 20 of the latching section 19. Depending on the respective situation of use however it is also possible to provide different numbers of possible latched rotary positions of the rotary selector. As shown in FIG. 3 the spring element is accordingly formed with four (rhombus spring), five (pentagon spring) or more elastic legs 24 which are connected together by way of the connecting ring 25. In that respect it is only necessary to note that the number of side faces 20 of the latching section 19 must always be an integral multiple of the number of elastic legs 24 of the spring element 22.

As indicated in FIG. 1A the rotary selector is further provided with a plate insert 28 which is arranged coaxially with respect to the control portion 16 in the control panel 10 and which serves as an information carrier. For example the plate insert 28 contains items of information for the user relating to the functionality of the rotary selector (program selection, power selection etc) and/or the setting values corresponding to the individual rotary positions (for example washing program, power level etc) for the electronic control system.

It will also be seen from FIGS. 1A and 1B that the control portion 16 and the adapter 18 are of a hollow-cylindrical configuration. With that structure there is the possibility of advantageously combining the rotary selector with a push button. In that case, a control portion 30 of the push button is arranged coaxially and centrally with respect to the control element 16 of the rotary selector and an adapter 32 of the push button is arranged coaxially and centrally with respect to the adapter 18 of the rotary selector. The push button acts on a suitable switch 39 (see FIG. 4A) arranged on the circuit board 14.

The control portion 30 of the push button can be made for example from ABS plastic while the adapter 32 of the push button is formed for example from POM.

Figure 4A:
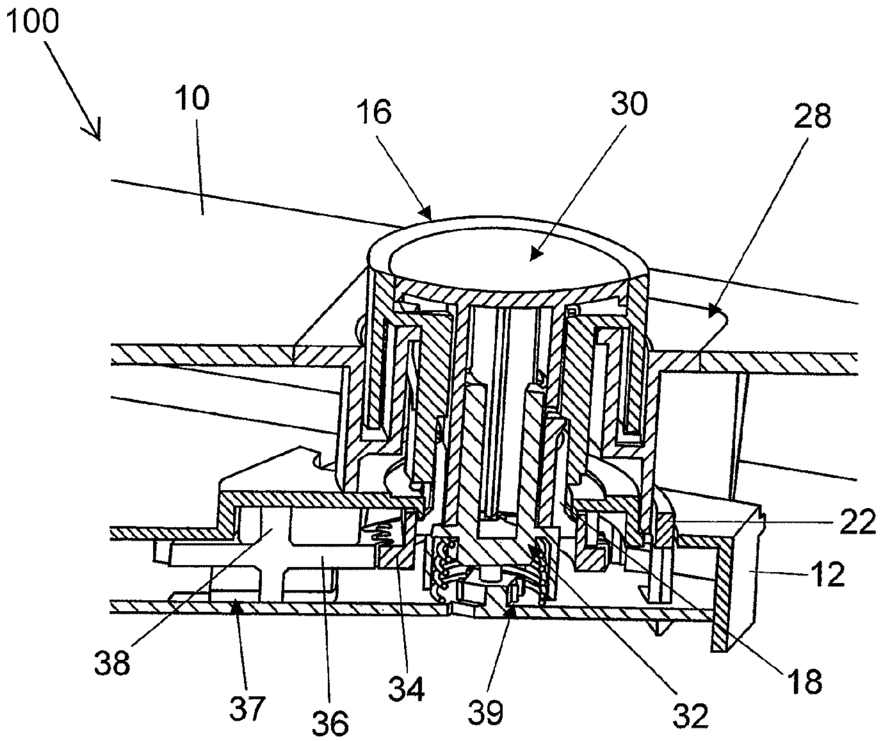
FIG. 4A is a perspective view in section through a rotary selector in accordance with a second embodiment of the present invention.
Figure 4B:
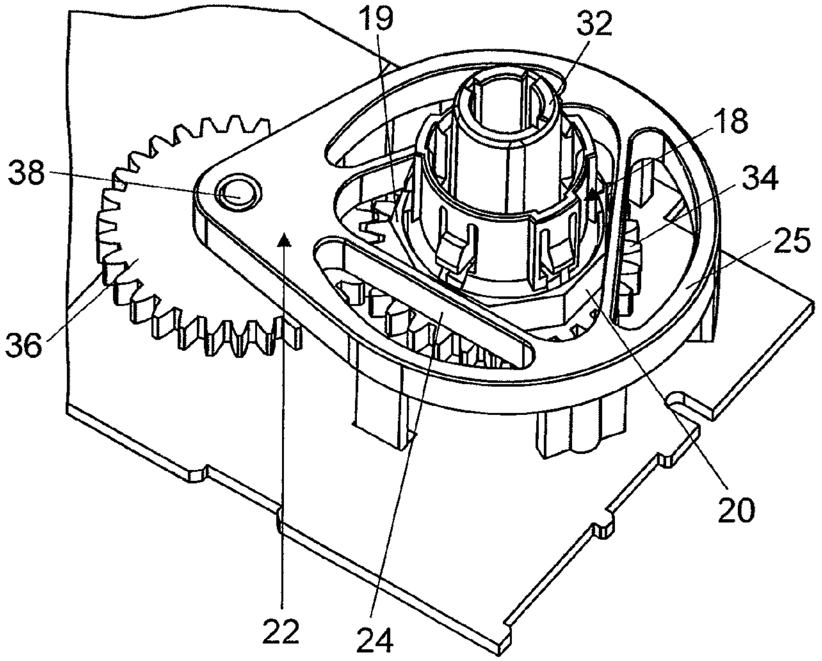
FIG. 4B is a perspective partial view from above of the rotary selector in accordance with the second embodiment of the invention.
Figure 5:
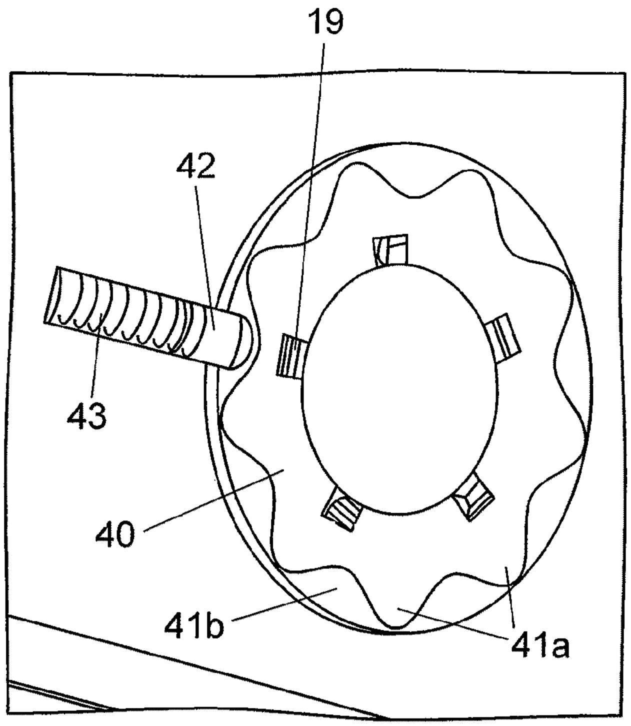
Fig. 5 PRIOR ART
FIGS. 5 and 6 are diagrammatic views illustrating prior art solutions for the latching action of conventional rotary selectors.
Figure 6:
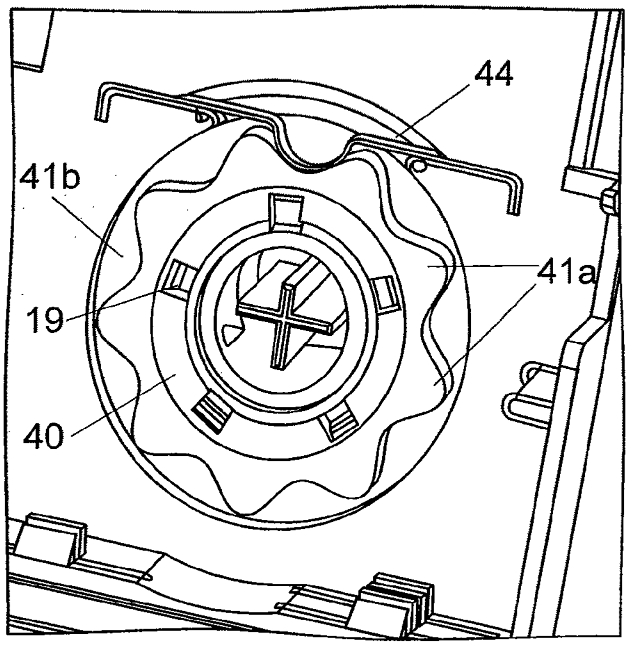
Fig. 6 PRIOR ART

A second embodiment of a rotary selector is described in greater detail hereinafter with reference to FIGS. 4A and 4B.

The rotary selector of the second embodiment differs from the first embodiment in regard to the manner of detecting or transmitting the rotation of the control portion 16 to the electronic control system. In this case, instead of the rotary position sensor 29, a potentiometer 37 is provided as a possible setting drive on the circuit board 14. The adapter 18 of the rotary selector is for that purpose provided at its lower end with a gear 34 in engagement with a transmission 36 for driving the potentiometer 37. In this case the transmission 36 is advantageously mounted by way of a mounting location 38 provided integrally on the spring element 22. As can be seen in particular from FIG. 4B for that purpose the connecting ring 25 of the spring element 22 is prolonged on the side towards the potentiometer 37.

The other components and the modes of operation thereof correspond to those of the foregoing first embodiment and therefore a detailed description thereof will not be included here.

The invention claimed is:

1. A rotary selector forming a control element for inputting a setting value to an electronic control system, comprising:

a rotatably mounted control portion and an adapter rotationally fixed to said control portion and disposed to assume rotary positions to be detected and transmitted to the electronic control system;

said adapter having a latching section with a given number of side faces formed and arranged uniformly in a circumferential direction, said side faces being substantially flat;

a stationary spring element coaxially disposed with said latching section of said adapter, said spring element having a given number of elastic legs formed and arranged uniformly in the circumferential direction of said latching section and extending tangentially relative to said side faces of said latching section; and the given number of said side faces of said latching section being an integral multiple of the given number of said elastic legs of said spring element.

2. The rotary selector according to claim 1, wherein said spring element is made of a plastic material.

3. The rotary selector according to claim 2, wherein said spring element is formed integrally with a housing of the electronic control system.

4. The rotary selector according to claim 1, wherein the given number of said elastic legs of said spring element is three, four, or five.

5. The rotary selector according to claim 1, which comprises a connecting ring formed integrally with said elastic legs and disposed to interconnect said elastic legs of said spring element.

6. The rotary selector according to claim 1, wherein said elastic legs of said spring element are respectively supported at both sides at their two ends.

7. The rotary selector according to claim 1, which comprises a sensor disposed to detect the rotary positions of said adapter.

8. The rotary selector according to claim 1, wherein a rotation of said adapter can be transmitted to a setting drive of the electronic control system.

9. The rotary selector according to claim 8, wherein said adapter is formed with a gear, and said spring element is provided with a mounting location for a transmission of the setting drive of the electronic control system, wherein the transmission is in engagement with the gear of said adapter.

10. The rotary selector according to claim 1, which comprises a plate insert associated with said control portion of said rotary selector and disposed coaxially with respect to said control portion as an information carrier.

11. The rotary selector according to claim 1, wherein said control portion and said adapter of said rotary selector are shaped as a hollow cylinder, and wherein a push button is disposed in the hollow cylinder of the rotary selector forming a control element for inputting a further setting value to the electronic control system.

12. In a control device of an electronic domestic appliance, the rotary selector according to claim 1.

13. A rotary selector forming a control element for inputting a setting value to an electronic control system, comprising:

a rotatably mounted control portion and an adapter rotationally fixed to said control portion and disposed to assume rotary positions to be detected and transmitted to the electronic control system;

said adapter having a latching section with a given number of side faces formed and arranged uniformly in a circumferential direction;

a stationary spring element coaxially disposed with said latching section of said adapter, said spring element having a given number of elastic legs formed and arranged uniformly in the circumferential direction of said latching section and extending tangentially relative to said side faces of said latching section, said elastic legs being substantially straight, and said elastic legs coming into surface contact with said side faces in a latched position of said control portion.

14. The rotary selector according to claim 13, wherein the given number of said side faces of said latching section being an integral multiple of the given number of said elastic legs of said spring element.

15. A rotary selector forming a control element for inputting a setting value to an electronic control system, comprising:

a rotatably mounted control portion and an adapter rotationally fixed to said control portion and disposed to assume rotary positions to be detected and transmitted to the electronic control system;

said adapter having a latching section with a given number of side faces formed and arranged uniformly in a circumferential direction, said side faces being substantially flat; and a stationary spring element coaxially disposed with said latching section of said adapter, said spring element having a given number of elastic legs formed and arranged uniformly in the circumferential direction of said latching section and extending tangentially relative to said side faces of said latching section.

* * * * *